US007589670B2

(12) United States Patent
Ochenbauer

(10) Patent No.: US 7,589,670 B2
(45) Date of Patent: Sep. 15, 2009

(54) DEVICE AND METHOD FOR POSITION INFORMATION

(75) Inventor: Roland Ochenbauer, Ternitz (AT)

(73) Assignee: Kapsch BusinessCom AG, Vienna (AT)

( * ) Notice: Subject to any disclaimer, the term of this patent is extended or adjusted under 35 U.S.C. 154(b) by 0 days.

(21) Appl. No.: 12/090,869

(22) PCT Filed: Aug. 25, 2006

(86) PCT No.: PCT/AT2006/000353

§ 371 (c)(1),
(2), (4) Date: May 29, 2008

(87) PCT Pub. No.: WO2007/045002

PCT Pub. Date: Apr. 26, 2007

(65) Prior Publication Data

US 2008/0224925 A1 Sep. 18, 2008

(30) Foreign Application Priority Data

Oct. 21, 2005 (AT) .............................. A 1722/2005

(51) Int. Cl.
G01S 1/02 (2006.01)
H04B 7/185 (2006.01)
(52) U.S. Cl. ................................ 342/357.1; 342/357.09
(58) Field of Classification Search ............ 342/357.02, 342/357.06, 357.09, 357.1, 357.15, 374; 701/207, 213; 455/277.1, 280
See application file for complete search history.

(56) References Cited

U.S. PATENT DOCUMENTS

| 6,141,570 | A | 10/2000 | O'Neill, Jr. et al. |
| 6,266,533 | B1* | 7/2001 | Zadeh et al. ............. 455/456.2 |
| 6,427,077 | B1 | 7/2002 | Alberth, Jr. et al. |
| 6,448,927 | B1 | 9/2002 | Ishigaki et al. |
| 6,559,794 | B1 | 5/2003 | Nakajima et al. |
| 6,584,331 | B2 | 6/2003 | Ranta |
| 6,963,744 | B2 | 11/2005 | Lin |
| 7,043,258 | B2 | 5/2006 | Haddrell |
| 7,260,378 | B2 | 8/2007 | Holland et al. |
| 2004/0192222 | A1* | 9/2004 | Vaisanen et al. ............... 455/78 |
| 2005/0037758 | A1* | 2/2005 | Rimoni ...................... 455/436 |
| 2005/0288054 | A1* | 12/2005 | Sakaniwa ................. 455/550.1 |
| 2006/0293066 | A1* | 12/2006 | Edge et al. ............... 455/456.3 |

* cited by examiner

Primary Examiner—Dao L Phan
(74) Attorney, Agent, or Firm—Bachman & LaPointe, P.C.

(57) ABSTRACT

A device for position information, the device comprising: a satellite position measuring device with an energy-consuming measuring mode in which the measuring device supplies the current position (pos) of the device to an output, and an energy-saving idle mode; and a mobile radio network communication device which is connected to the output and used to send the position (pos) via a cellular mobile radio network. The communication device supplies the local reception field intensity (|E|) and the local cell characteristic (cell) of the mobile radio network to an interface. The device is characterized by a control device which is connected to the output of the position measuring device and the interface of the communication device, the control device switching the position measuring device into the measuring mode in the event of a variation of the reception field intensity (E) exceeding a threshold value (S), or in the event of a variation of the cell characteristic (cell), and if the position (pos) remains the same over a pre-determined time span (T), the control device switches the position measuring device into the idle mode.

10 Claims, 1 Drawing Sheet

DEVICE AND METHOD FOR POSITION INFORMATION

BACKGROUND OF THE INVENTION

The present invention relates to an apparatus for position information, comprising a satellite assisted position measuring device with a power drawing measurement mode, in which it provides the present position of the apparatus at an output, and a power saving idle mode, a mobile radio network assisted communication device connected to said output for the purpose of sending the position via a cellular mobile radio network, where the communication device provides the local reception field strength and the local cell identifier of the mobile radio network at an interface.

The invention also relates to a method for position information using such position measuring and communication devices.

Combined satellite navigation and mobile radios are used for tracking freight or in fleet management, for example. A large problem in this context is the high power consumption of the known apparatuses, because particularly in the case of mobile freight, such as containers, refrigerated containers, etc., an onboard power supply is not always available.

Alternative supplies using solar cells and storage batteries have therefore already been proposed. Particularly in the logistics sector, however, there are often long stationary times in the dark, for example in a warehouse, on an unlit siding, etc., which would require extremely large storage batteries.

EP 1 132 713 discloses a position information apparatus of the type cited in the introduction in which the satellite assisted position measuring device is a GPS receiver which can be put into a power saving idle mode ("standby"). EP 1 132 713 proposes putting the GPS receiver into the measurement mode only when, by way of example, a key on the communication device (a mobile telephone) is pressed, a particular number is dialed, a call is received on the mobile telephone, the mobile telephone is outside of its reception range or a timer expires. The first variants require the user to actively take action in order to initiate the position finding, while the variant with the timer results in a periodic power consumption in the GPS receiver.

The aim of the invention is to develop an apparatus and a method for position information further such that they have a particularly low average power requirement under practical conditions of use. In a first aspect of the invention, this aim is achieved with an apparatus of the aforementioned type which is distinguished by a control device which is connected to the output of the position measuring device and to the interface of the communication device and which, in the event of a change in the reception field strength which exceeds a threshold value or in the event of a change in the cell identifier, switches the position measuring device to the measurement mode and, if the position remains the same over a prescribed period, switches the position measuring device to the idle mode.

SUMMARY OF THE INVENTION

The invention is based on the insight that the "coarse" position information which can be obtained from a change in the reception field strength or in the cell identifier of the cellular mobile radio network can be utilized in order to switch on the satellite assisted position measuring device for the "fine" position finding. If the ascertained position does not change for a time, the position measuring device is put back into the power saving idle mode. This allows a significant reduction in the power consumption or power requirement on average over time.

One preferred embodiment of the invention is distinguished in that the position measuring device is a GPS receiver and the communication device is a GSM mobile radio module, which means that commercially available components can be used and a broad scope of use is ensured.

In line with another preferred embodiment of the invention, said threshold value is 2 to 10 dBm, particularly preferably 3 to 5 dBm. In addition, said period is preferably 3 to 15 min, particularly preferably approximately 10 min. These values are a practicable compromise between sufficient accuracy and minimal average power consumption.

It is particularly beneficial if said threshold value is for its part a function of the local reception field strength, which allows largely identical position measuring accuracy to be achieved throughout the mobile radio network.

In a second aspect, the invention provides a method for position information using a satellite assisted position measuring device with a power drawing measurement mode and a power saving idle mode and also a mobile radio network assisted communication device for sending the position via a cellular mobile radio network, which is distinguished, in line with the invention, by the following steps in any order:

the local reception field strength or the local cell identifier of the mobile radio network is ascertained using the communication device and, if the reception field strength changes at least by a prescribed threshold value or the cell identifier changes, the position measuring device is switched to the measurement mode;

the present position of the apparatus is ascertained using the position measuring device and, if the position remains the same over a prescribed period, the position measuring device is switched to the idle mode.

BRIEF DESCRIPTION OF THE DRAWINGS

Further features and advantages of the invention can be found in the subsequent invention of a preferred embodiment in connection with the enclosed drawing, in which.

DETAILED DESCRIPTION

Figure 1:
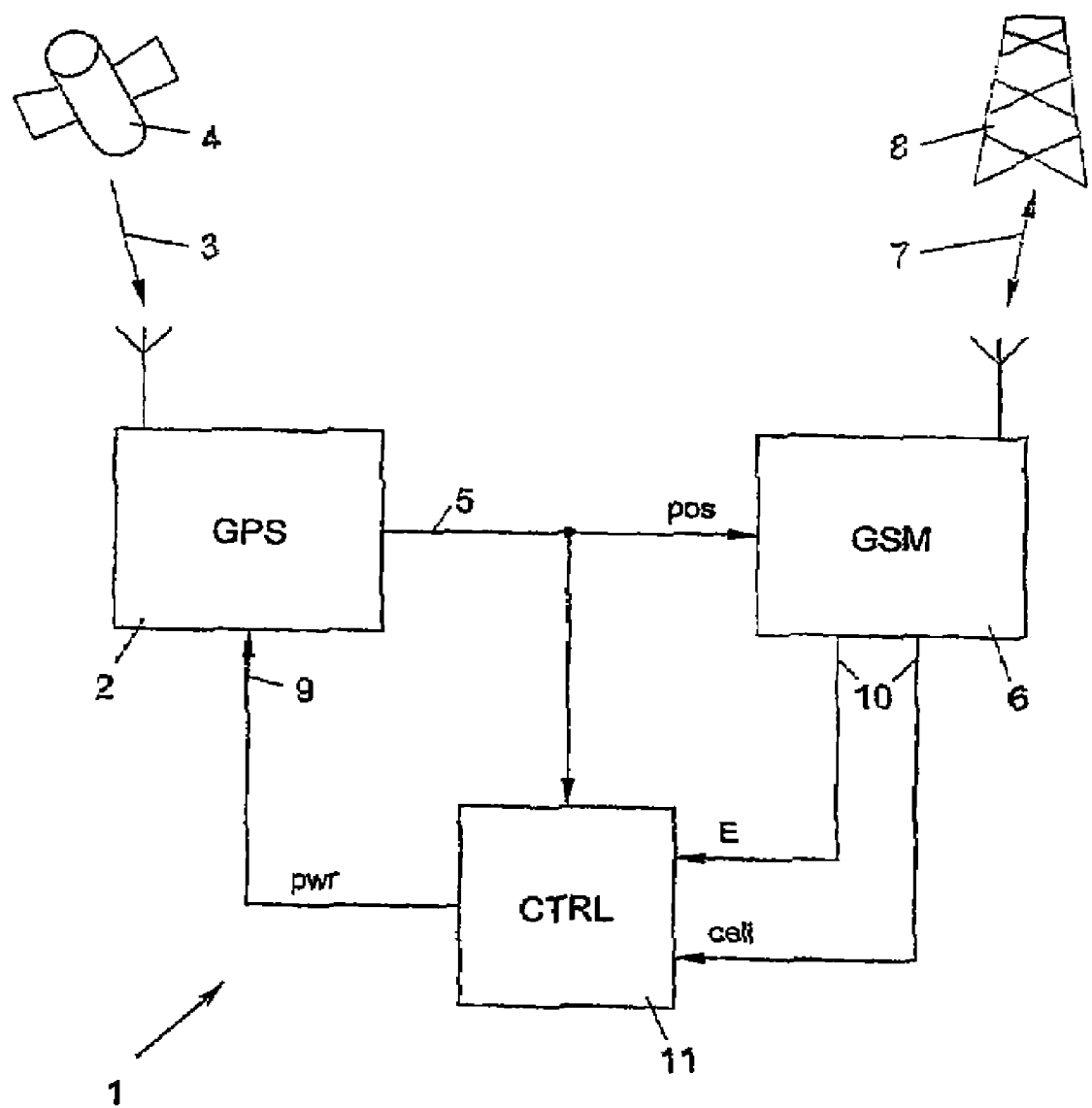
FIG. 1 shows the apparatus of the invention in a schematic block diagram.

FIG. 1 shows an apparatus 1 with a GPS receiver 2 which receives navigation signals 3 from one or more satellites 4, determines its position pos therefrom and provides said position at an output 5. The output 5 has a GSM mobile radio module 6 connected to it which sends the ascertained position pos via a cellular mobile radio network 7 to a control center 8 for further evaluation, for example the control center in a fleet management or freight tracking system.

Instead of the GPS receiver 2, it is also possible to use any other satellite assisted position measuring device known in the art, for example an A-GPS, D-GPS, GLONASS, GALILEO, EGNOS, WAAS receiver, etc. In the same way, instead of a GSM mobile radio module, it is also possible to use any other mobile radio network assisted communication device known in the art, for example a mobile telephone or modem based on the TDM, GPRS, UMTS standard, etc.

The GPS receiver 2 has two different modes of operation, specifically a power drawing measurement mode (mode of operation), in which it ascertains the present position pos and provides it at the output 5, and a power saving idle mode ("standby"), in which it stores the last ascertained position or is simply switched off completely, for example. A schematically shown control input 9 can be used to switch the GPS receiver 2 between its measurement mode and its idle mode.

Commercially available GPS receivers 2 have a power draw of approximately 200 mA in the measurement mode (mode of operation) and a power draw of approximately 20 mA in the idle mode or standby, for example.

The GSM mobile radio module 6 also has various modes of operation, including a power drawing transmission mode, in which it sends the ascertained position pos to the control center 8, and a power saving standby or reception mode. The GSM mobile radio module 6 has an interface 10 on which it provides at least the local reception field strength E and the cell identifier cell of the cellular mobile radio network 7 in any mode of operation.

In the case of a GSM network, the local reception field strength E is defined as the power level in the ETSI specification GSM 05.05, for example, and the cell identifier cell ("cell-ID") in the ETSI specification GSM 03.03.

The apparatus 1 also comprises a control device 11 which is connected to the output 5 of the GPS receiver 2 and to the interface 10 of the GSM mobile radio module 6 and which produces a control signal pwr for the control input 9 of the GPS receiver 2 from the position pos, the reception field strength E and the cell identifier cell, specifically in the following manner:

1. GPS receiver is in the idle mode: When the reception field strength E changes at least by a prescribed threshold value S, i.e. $|\Delta E| > S$, then the control device 11 switches the GPS receiver 2 to the measurement mode.

2. GPS receiver is in the measurement mode:

When the position pos ascertained by the GPS receiver 2 remains the same over a prescribed period T (or the same position is ascertained several times in succession with periodic ascertainment of the position pos), then the control device 11 switches the GPS receiver 2 back to the idle mode.

The threshold value S is ascertained to minimize the average power requirement of the overall apparatus 1 in the chosen environment of use; preferably, the threshold value S is 2 to 10 dBm, particularly preferably 3 to 5 dBm.

The measure used here for the reception field strength E is the power level (received power level) based on ETSI specification GSM 05.05 in dBm.

The local reception field strength E is dependent on the distance between the apparatus 1 and the closest base station in the mobile radio network 7. By way of example, at a distance of 250 m, the reception field strength E is −20 dBm, and a change $\Delta E$ of +/−5 dBm corresponds to a distance change of approximately 150 m. At a greater distance from the closest base station, the same distance change has a corresponding lower change $\Delta E$ by +/−3 dBm, for example, so that the threshold value S needs to be reduced accordingly if the change of position is to be determined with the same accuracy.

It is therefore also possible to stipulate the threshold value S as a function of the local reception field strength E so as always to achieve the same positioning accuracy, i.e. S=f(E).

The period T is also ascertained to minimize the average power requirement; preferably, the period T is 3 to 15 min, particularly preferably approximately 10 min.

The invention is not limited to the embodiments shown but rather comprises all variants and modifications which fall within the scope of the claims.

The invention claimed is:

1. An apparatus for position information, comprising:
   a satellite assisted position measuring device having (1) a power drawing measurement mode which provides a present position of the apparatus at an output, and (2) a power saving idle mode;
   a mobile radio network assisted communication device connected to said output for sending the position via a cellular mobile radio network, wherein the communication device provides a local reception field strength and a local cell identifier of the mobile radio network at an interface; and
   a control device which is connected to the output of the position measuring device and to the interface of the communication device, wherein, in the event of a change in the reception field strength which exceeds a threshold value or in the event of a change in the cell identifier, the control device switches the position measuring device to the measurement mode and, if the position remains the same over a prescribed period, switches the position measuring device to the idle mode.

2. The apparatus as claimed in claim 1, wherein the position measuring device is a GPS receiver and the communication device is a GSM mobile radio module.

3. The apparatus as claimed in claim 1, wherein said threshold value is 2 to 10 dBm.

4. The apparatus as claimed in claim 3, wherein the threshold value is a function of the local reception field strength.

5. The apparatus as claimed in claim 1, wherein said period is 3 to 15 min.

6. A method for position information using a satellite assisted position measuring device with a power drawing measurement mode, a power saving idle mode and a mobile radio network assisted communication device for sending the position via a cellular mobile radio network, comprising the following steps in any order:
   (a) ascertaining local reception field strength or local cell identifier of a mobile radio network using a communication device and, if the reception field strength changes at least by a prescribed threshold value or the cell identifier changes, the position measuring device is switched to the measurement mode;
   (b) ascertaining a present position of the apparatus using the position measuring device and, if the position remains the same over a prescribed period, the position measuring device is switched to the idle mode.

7. The method as claimed in claim 6, wherein the position measuring device used is a GPS receiver and the communication device used is a GSM mobile radio module.

8. The method as claimed in claim 6, wherein said threshold value is 2 to 10 dBm.

9. The method as claimed in claim 8, wherein the threshold value is a function of the local reception field strength.

10. The method as claimed in claim 6, wherein said period is 3 to 15 min.

\* \* \* \* \*